US009471971B2

(12) United States Patent
Daugela et al.

(10) Patent No.: US 9,471,971 B2
(45) Date of Patent: Oct. 18, 2016

(54) SYSTEM AND METHOD FOR IMAGE-BASED ANALYSIS OF A SLURRY AND CONTROL OF A SLURRY PROCESS

(71) Applicant: SYNCRUDE CANADA LTD. in trust for the owners of the Syncrude Project, as such owners exist now and in the future, Fort McMurray (CA)

(72) Inventors: Darcy Daugela, Edmonton (CA); Barry Bara, Edmonton (CA); Robert Skwarok, Edmonton (CA); Rodney Ridley, Edmonton (CA); Pat Dougan, Edmonton (CA); Mark Polak, Edmonton (CA)

(73) Assignee: SYNCRUDE CANADA LTD., Fort McMurray (CA)

( * ) Notice: Subject to any disclaimer, the term of this patent is extended or adjusted under 35 U.S.C. 154(b) by 59 days.

(21) Appl. No.: 14/494,365

(22) Filed: Sep. 23, 2014

(65) Prior Publication Data
US 2016/0086321 A1    Mar. 24, 2016

(51) Int. Cl.
| | |
|---|---|
| *G06K 9/00* | (2006.01) |
| *G06T 7/00* | (2006.01) |
| *F15D 1/06* | (2006.01) |
| *C10G 1/00* | (2006.01) |
| *G01F 1/00* | (2006.01) |
| *G05D 21/02* | (2006.01) |
| *E03B 1/00* | (2006.01) |

(52) U.S. Cl.
CPC .............. *G06T 7/0002* (2013.01); *C10G 1/00* (2013.01); *F15D 1/06* (2013.01); *G01F 1/00* (2013.01); *G05D 21/02* (2013.01)

(58) Field of Classification Search
CPC .................................... G06K 9/00; G06T 7/00
USPC ....................................... 382/100; 137/2, 806
See application file for complete search history.

(56) References Cited

U.S. PATENT DOCUMENTS

| | | | | |
|---|---|---|---|---|
| 5,454,912 | A * | 10/1995 | Dougherty | ........... G01N 1/2035 162/263 |
| 6,178,383 | B1 * | 1/2001 | Pegram | ................ G01N 1/2035 356/417 |
| 6,636,812 | B2 * | 10/2003 | Pegram | ................ G01N 1/2035 356/417 |
| 2014/0183103 | A1 * | 7/2014 | Kadali | ................... C10G 1/047 208/390 |

* cited by examiner

*Primary Examiner* — Abolfazl Tabatabai
(74) *Attorney, Agent, or Firm* — Bennett Jones LLP

(57) ABSTRACT

A system for characterizing a slurry in a slurry process includes a flow tube, a camera, and a computer. The system is suitable for use with an oil sands extraction slurry processed or treated by an oil sands extraction slurry process. The slurry is diverted from the slurry process into the flow tube. The camera images the slurry as it flows through a transparent portion of the flow tube to produce a digital image of the slurry. The computer analyzes the digital image to determine a slurry characteristic. Based on the determined slurry characteristic, the computer may predict a performance metric of the slurry process and adjust an operating parameter of the slurry process to optimize the slurry process towards a target performance metric. Multiple systems may be used to continuously monitor slurry characteristics at upstream and downstream steps of the slurry process, and determine correlations between those characteristics.

36 Claims, 6 Drawing Sheets

SYSTEM AND METHOD FOR IMAGE-BASED ANALYSIS OF A SLURRY AND CONTROL OF A SLURRY PROCESS

FIELD OF THE INVENTION

The present invention relates to analysis of slurries in a slurry process, and more particularly to a system and method suitable for image-based analysis of various oil sands extraction slurries produced or treated during a process for extracting bitumen oil sands ore and the control of such bitumen extraction processes.

BACKGROUND OF THE INVENTION

Extraction of bitumen from mined oil sands ore has been practiced in Alberta, Canada, for many years. Bitumen extraction processes can be water-based processes, solvent-based processes or a combination of water-based and solvent-based processes. In water-based bitumen extraction processes, generally, the mined oil sands ore is crushed and mixed with heated water, steam, and caustic (NaOH) to produce an oil sands slurry that is hydro-transported in a pipeline to a primary separation station. During hydro-transport, turbulent flow of the slurry in the pipeline causes bitumen films surrounding the sand particles to begin to separate, attach to entrained air bubbles, and form bitumen droplets. The primary separation station may comprise a primary separation vessel (PSV) wherein the oil sands slurry is introduced to float the bitumen to the top of the PSV as a bitumen-rich froth, which is generally referred to as "primary bitumen froth", while middlings remain suspended in the PSV, and an underflow settles to the bottom of the PSV. The middlings, underflow and tailings from the PSV may then be subjected to secondary flotation treatment to recover residual bitumen contained therein (generally referred to as "secondary bitumen froth"). The primary bitumen froth, secondary bitumen froth or both is further treated with a diluent, such as naphtha or paraffin, and subjected to gravitational or centrifugal separation to separate diluted bitumen from tailings.

Oil sands that are processed by bitumen extraction processes are highly variable in their physical properties. Variations in the physical properties of the oil sands feed stock and the various oil sands slurries derived therefrom will affect the mechanical and chemical separation phenomena in the bitumen extraction or tailings reclamation processes. When designing and optimizing bitumen extraction and/or tailings reclamation processes, it can therefore be difficult to ascertain whether a change in process performance is caused by a deliberate change to the process or to chance variation in the slurry/tailings processed by the process. Accordingly, analyzing the slurries, including tailings, to determine their physical properties can yield information that is valuable to predicting and optimizing bitumen extraction and tailings treatment processes, and diagnosing problems in such processes. However, the complicated and heterogeneous nature of oil sands extraction slurries presents unique practical obstacles for conventional analysis equipment. For example, sand grains and solid fines suspended in the oil sands extraction slurries will tend to erode sensing elements placed directly in a slurry flow path. Further still, bitumen in oil sands extraction slurries tend to coalesce and interfere with the proper operation of sensing equipment. While these challenges can be addressed to an extent by using a sampling device to remove discrete samples of oil sands extraction slurries from a slurry transport line, repeated operation of a sampling device may wear and cause failure of seals associated with the sampling device.

Accordingly, there is a need in the art for systems and methods of analyzing slurries such as oil sands extraction slurries. Preferably, such systems and methods address the unique challenges posed by slurries such as oil sands extraction slurries, permit continuous sampling of slurries from a slurry transport line, rapidly analyze the slurries for real-time control and monitoring of bitumen extraction and tailings treatment processes, and provide a tool that can be used for optimization of slurry process performance.

SUMMARY OF THE INVENTION

The present invention is directed to computer-implemented, image-based analysis of a slurry and control of a slurry process. In particular, the invention may be suitable for characterizing oil sands extraction slurries produced or treated by oil sands extraction slurry processes, including bitumen extraction processes, bitumen froth treatment processes, and tailings treatment processes.

In one aspect, the present invention provides a system for characterizing a slurry, the system comprising:
 (a) a flow tube comprising at least one transparent viewing portion, a slurry inlet, and a slurry outlet;
 (b) at least one camera positioned to image the slurry flowing through the viewing portion of the flow tube; and
 (c) a computer comprising a processor operatively connected to the camera, and a memory storing a set of instructions, wherein the processor is responsive to the set of instructions to execute a method comprising the steps of:
  (i) imaging the slurry flowing through the at least one viewing portion of the flow tube to produce at least one digital image of the slurry; and
  (ii) analyzing the at least one digital image to determine at least one slurry characteristic.

In another aspect, the present invention provides a method for characterizing a slurry, the method comprising the steps of:
 (a) flowing the slurry through a flow tube comprising at least one transparent viewing portion;
 (b) imaging the slurry with at least one camera as the slurry flows through the at least one viewing portion to produce at least one digital image of the slurry; and
 (c) analyzing the at least one digital image with a computer to determine at least one slurry characteristic.

In another aspect, the present invention provides a method for online control of a slurry process for processing a slurry, the method comprising the steps of:
 (a) flowing the slurry through a flow tube comprising at least one transparent viewing portion;
 (b) imaging the slurry with at least one camera as the slurry flows through the at least one viewing portion to produce at least one digital image of the slurry;
 (c) analyzing the at least one digital image with a computer to determine at least one slurry characteristic;
 (d) determining a performance metric for the slurry process based on a predictive relationship with the determined at least one slurry characteristic; and
 (e) based on the determined at least one slurry characteristic and the determined performance metric, adjusting an operating parameter of the slurry process to adjust the performance metric towards a target value or range.

Other features will become apparent from the following detailed description. It should be understood, however, that the detailed description and the specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the following figures. It is understood that the drawings provided herein are for illustration purposes only and are not necessarily drawn to scale.

DESCRIPTION OF THE PREFERRED EMBODIMENT

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention relates generally to a system and method for image-based analysis of a slurry and control of a slurry process. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

As used herein, the term "slurry" refers a mixture of a liquid and particulate objects, which may be an immiscible second liquid, gas or solid. As used herein, the term "oil sands extraction slurry" refers to a slurry produced during any step of a process for extracting bitumen from oil sands, with such steps including water, solvent or solvent/water extraction of bitumen, bitumen froth treatment, and tailings treatment. Without limitation, "oil sands extraction slurry" includes slurries of the following types: any slurry comprising mined oil sands and water (i.e., an "oil sands slurry") that is conventionally fed into a primary separation vessel (PSV) in hot/warm water bitumen extraction from oil sands ores; any slurry in bitumen froth, middlings, underflow and tailings streams produced during the hot/warm water bitumen extraction process; any slurry streams produced during a bitumen froth treatment process, for example, froth treatment tailings; any slurry streams produced during oil sand tailings treatment; and, any slurry that is produced during solvent or solvent/water extraction of bitumen from oil sands. An oil sands extraction slurry may contain particulate objects such as bitumen droplets, sand grains, entrained air bubbles, and other solid fine particles.

As used herein "slurry process" means any process that either produces a slurry or treats a slurry or both. Without limitation, a "slurry process" includes a "oil sands extraction slurry process", which may be any slurry process that operates on an oil sands extraction slurry, such as a hot/warm water bitumen extraction process, a solvent or solvent/water bitumen extraction process, a bitumen froth treatment process, or a tailings treatment process.

Figure 1:
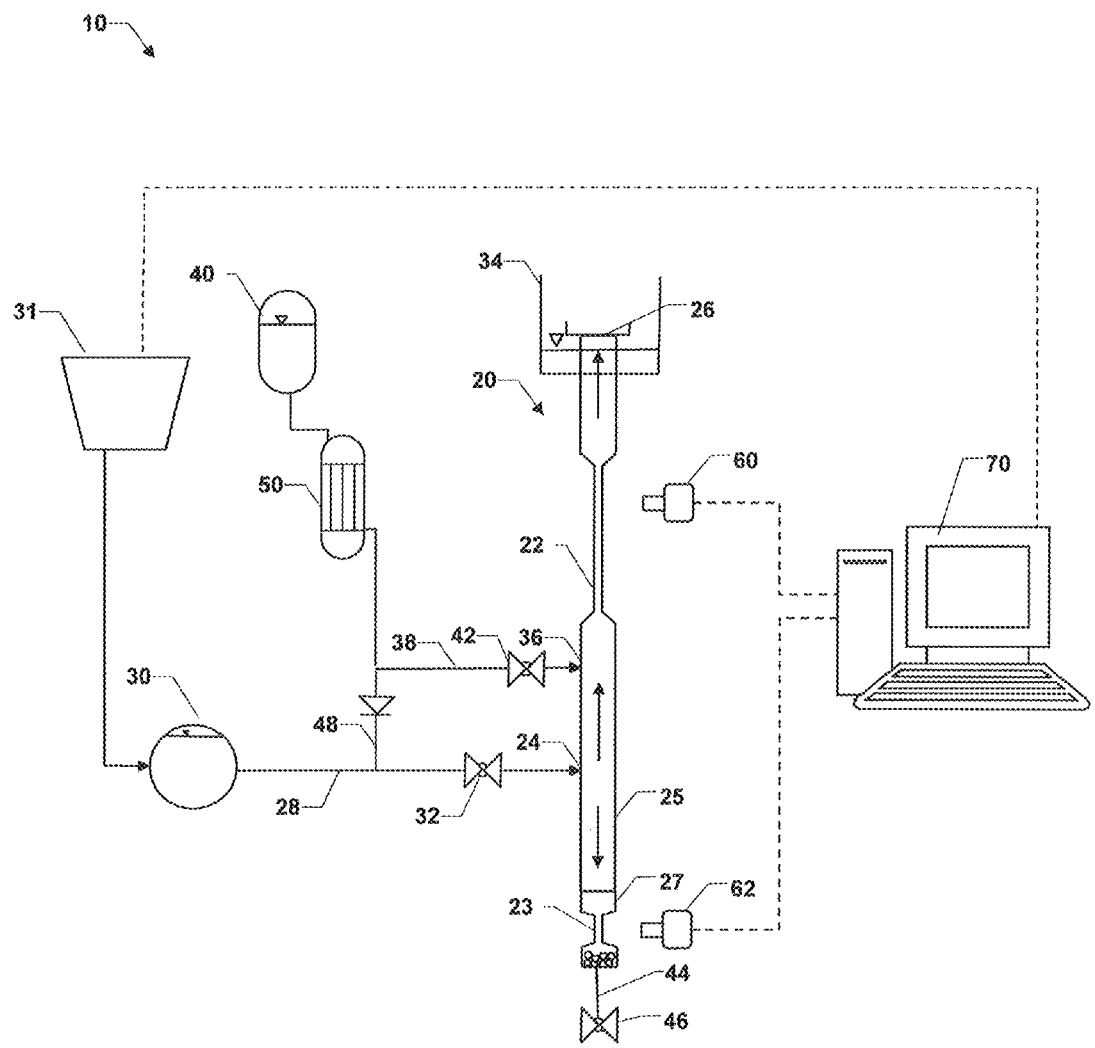
FIG. 1 is a schematic depiction of one embodiment of the system of the present invention for analyzing oil sands extraction slurries.

FIG. 1 provides a schematic depiction of one embodiment of the system 10 of the present invention. In general, the system 10 includes a flow tube 20 with a transparent viewing portion 22, a camera 60, and a computer 70 operatively connected to the camera 60. In FIG. 1, the dashed lines represent operative connections between two components, which connections may be either wired or wireless connections, or a combination of wired and wireless connections.

By way of illustration, the embodiment shown in FIG. 1 will be further described with reference to oil sands extraction slurries, and more particularly with reference to an oil sands slurry that is fed from a slurry hydro transport pipeline 30 into a primary separation vessel (PSV) (not shown) in a hot/warm water bitumen extraction process represented by reference numeral 31. However, it will be understood that reference numeral 31 can generally be any slurry process. Further, the slurry transport line 30 can be a line that feeds a different type of oil sands extraction slurry at a different step of an oil sands extraction slurry process. Accordingly, the present invention is not limited by the immediate source of the slurry in the slurry transport line 30. In other examples, the slurry transport line 30 may be lines that transport middlings, underflow or tailings from various steps of the oil sands extraction slurry process 31, which may be a solvent or solvent/water based bitumen extraction process, a bitumen froth treatment process, or a tailings treatment process.

The flow tube 20 provides a conduit for controlled flow of the slurry in the viewing portion 22, between a slurry inlet 24 to a slurry outlet 26. As used herein, the term "upstream" in describing the relative position of a first element associated with the flow tube 20 to a second element associated with the flow tube 20 means that the first element is located, relative to the second element, in the flow direction from the slurry outlet 26 towards the slurry inlet 24. Conversely, the term "downstream" in describing the relative position of a first element associated with the flow tube 20 to the second element associated with the flow tube 20 means that the first element is located, relative to the second element, in the flow direction from the slurry inlet 24 towards the slurry outlet 26.

In the embodiment shown in FIG. 1, the flow tube 20 comprises a generally cylindrical tube, made of colourless, transparent glass. The tube is oriented vertically lengthwise and measures about 1.8 meters in length, with a circular cross section with a diameter of about 5 centimeters. In other embodiments (not shown), the flow tube 20 may have a different cross sectional shape, orientation, and size. Further, portions of the flow tube 20 other than the viewing portion 22 may be opaque.

The slurry inlet 24 allows for inflow of the slurry into the flow tube 20, so that it can be imaged in the viewing portion 22. In the embodiment shown in FIG. 1, the slurry inlet 24 is formed in the side wall of the tube, and is in fluid communication, via slurry inlet line 28, with a slurry transport line 30. The slurry inlet line 28 includes a slurry inlet valve 32 to selectively open and close the slurry inlet 24 of the flow tube 20. The slurry inlet line 28 may have a considerable length so that the flow tube 20, camera 60 and computer 70 can be located at any desired distance away from the slurry transport line 30. In embodiments, for example, the slurry inlet line 28 may transport the slurry over a significant distance of more than 1 meter, 5 meters, 10 meters, or 20 meters from the slurry transport line to the slurry inlet 24 of the flow tube 20. This facilitates physically configuring the components of the system 10, as appropriate for a particular environment, and allows flow tubes 20 of multiple systems 10 to be located near a common shared computer 70.

The slurry outlet 26 allows for discharge of the slurry from the flow tube 20. In the embodiment shown in FIG. 1, the oil sands slurry flows primarily in an upwards direction from the slurry inlet 24 to the slurry outlet 26 formed at the top of the flow tube 20. The slurry outlet 26 is formed into an overflow weir that discharges the slurry into an open reservoir 34, maintained at atmospheric pressure. The overflow weir allows the slurry passing through slurry outlet 26 to overflow smoothly into the open reservoir 34, so as to avoid jetting the slurry out of the flow tube 20 in a fountain-like manner, and recirculation of the slurry back into the flow tube 20. The discharged slurry in the reservoir 34 may be collected for chemical analysis if desired.

The transparent viewing portion 22 of the flow tube 20 exposes the oil sands slurry within the flow tube 20 for imaging by the camera 60. In the embodiment shown in FIG. 1, the viewing portion 22 of the flow tube 20 is formed by two opposed planar surfaces about 20 centimeters in length, and separated by a narrow gap, so that the viewing portion 22 is laminar in form. The flow tube 20 and its viewing portion 22 may be manufactured by glassblowing a single tubular section of molten glass tubing and flattening the tubing to form the viewing portion. Alternatively, the viewing portion 22 may be constructed from two discrete pieces of glass plate that are placed opposite each other, and connected by couplers in a fluid tight manner to the adjacent portions of the flow tube 20 immediately above and below the plates. The size of the gap, measured in the direction of the central viewing angle of the camera 60, is preferably sufficiently small so that the particulate objects pass through the viewing portion in a single layer (i.e., without overlapping each other) so that their boundaries can be readily delineated. At the same time, the gap is preferably sufficiently large to avoid unduly impeding the flow of the slurry or a causing a build up of particulate objects in the slurry. In the embodiment shown in FIG. 1, the gap between the inside surfaces of the plate-like surfaces is about 2 millimeters, whereas the adjacent upstream and downstream portions of the flow tube 20 have a diameter of about 5 centimeters. It has been found that this thickness of gap allows upward passage of bitumen droplets in an oil sands slurry where the bitumen droplets range in size from about 100 μm to about 600 μm while avoiding agglomeration of the bitumen droplets. The person skilled in the art will be able to select different sizes of gaps to suit particular slurry compositions and flow rates through the viewing portion.

In other embodiments (not shown) the viewing portion 22 may have a different configuration and size. The viewing portion 22 may be configured so that the flow of the slurry through the viewing portion 22 is substantially non-turbulent for a given flow condition and slurry composition. Except for the narrowing of the flow tube 20 to form the viewing portion 22, it is preferable that convergences and divergences in the cross-section of the flow tube 20 be minimized or avoided, as they may trap bitumen droplets, or cause recirculation zones that interfere with the flow of the slurry through the flow tube 20.

Embodiments of the flow tube 20 may also include a carrier fluid inlet 36 to allow inflow of a carrier fluid into the flow tube 20, upstream of the viewing portion 22. The carrier fluid may assist the upward flow of the slurry through the viewing portion 22 of the flow tube 20, and prevent buildup of slower moving particulate objects upstream of the viewing portion 22. In addition, the carrier fluid, being relatively free of particulate objects, allows for more precise control over the flow rate of the slurry through the viewing portion 22 of the flow tube 20. In the embodiment shown in FIG. 1, the carrier fluid inlet 36 is positioned downstream of the slurry inlet 24, but upstream of the viewing portion 22. A carrier fluid line 38 provides fluid communication between a carrier fluid source, such as water vessel 40, and the carrier fluid inlet 36. The carrier fluid line includes carrier fluid valve 42 to selectively open and close the carrier fluid inlet 36. Embodiments of the flow tube 20 may also include a bottom outlet 44 with a bottom valve 46, which may be used in conjunction with the carrier fluid inlet 36 for flushing the flow tube 20 as will be described below.

Embodiments of the flow tube 20 may include a transparent second viewing portion 23 to expose the slurry to imaging by a second camera 62. In the embodiment shown in FIG. 1, the second viewing portion 23 is formed in a similar manner as the viewing portion 22, by a narrowing of the side walls of the flow tube 20, but is shorter in length than viewing portion 22 measuring about 10 centimeters in length. The flow tube 20 may comprise an upper part 25 that includes viewing portion 22, and a separately formed lower part 27 that includes the second viewing portion 23. The lower end of the upper part 25 may be coupled in a fluid tight manner to the upper end of the lower part 27 using suitable fittings as are known in the art. The second viewing portion 23 may be positioned downstream of the slurry inlet 24 and the carrier inlet 36, at a sufficient distance away from the immediate zone of influence inflowing slurry and carrier fluid, near the bottom of the flow tube 20. This positioning of the second viewing portion 23 allows for imaging of the underflow in the flow tube 20—i.e., that portion of the slurry that is not carried upwards through the viewing portion 22.

Embodiments of the system 10 may include a dilution means for diluting the slurry prior to entering the flow tube 20. Dilution of the slurry may be necessary to reduce the spatial density of particulate objects in the slurry so that they can be clearly delineated when imaged by the camera 60. In the embodiment shown in FIG. 1, for example, the dilution means include a dilution fluid line 48 that provides fluid communication between the water vessel 40 and the slurry inlet line 28, upstream of the slurry inlet 24.

Embodiments of the system 10 may also include a temperature control means for controlling the temperature of the slurry flowed through the flow tube 20. In the case of an oil sands extraction slurry, varying the temperature of the slurry may help prevent bitumen droplets from coalescing with each other, so as to improve the accuracy and reliability of the image-based analysis, especially where the slurry characteristic to be determined is bitumen droplet size. It may also be used to control the viscosity of the oil sands extraction slurry, and allow for controlled experimentation on the effect of temperature on slurry properties. In the embodiment shown in FIG. 1, for example, the temperature control means includes a heat exchanger 50 associated with the fluid vessel to control the temperature of the water that is discharged from the water vessel 40 into the dilution fluid line 44 or the carrier fluid line 38. In one embodiment, the temperature of the water is controlled at about 10 to 25 degrees Celsius. In other embodiments (not shown), the temperature control means may include other suitable devices known in the art for heating or cooling one or more of the slurry, the dilution fluid, or the carrier fluid, and controlling their temperature.

The camera 60 images the slurry as it passes through the viewing portion 22 of the flow tube 20 to produce a digital image of the slurry. The camera 60 may comprise any device that digitally encodes a still image or a video image of the slurry. Digital camera 60 technology is known by persons skilled in the art and does not itself constitute part of the present invention. The digital image may comprise any numeric representation of an image of the slurry. As is known by persons skilled in the art, digital images may assume one of several format types. One known format type is a raster format in which the digital image is represented by a notional array of pixels, with each pixel representing a unique spatial position within the image, and with each pixel having one or more associated numerical values representing the brightness of one or more colors.

In one embodiment, the camera 60 is configured to resolve a particular object in the slurry having a size of about 600 μm or smaller, and more particularly 100 μm or smaller. As is known by persons skilled in the art, such resolution may be achieved with a camera 60 equipped with a suitable combination of optical lens, and digital image sensor. As used in this context, the term "resolve" means that the digital image produced by the camera 60 encodes information that makes it possible to distinguish between two objects separated by the specified object size, at the angular distance formed by the camera 60 and the viewing portion 22 of the flow tube 20. In one embodiment, the camera 60 is a high speed video camera capable of capturing images at a frequency of about 500 frames per second. In one embodiment, the camera 60 may be configured with optical or computerized equipment to selectively filter certain light wavelengths corresponding to certain colors to enhance the contrast of certain colors encoded by the digital images to facilitate their analysis.

Embodiments of the system 10 may include multiple cameras 60, 62 positioned to image the slurry as it flows the viewing portion 22 and second viewing portion 23, respectively, of the flow tube 20. As will be appreciated, when a camera 60 is placed sufficiently close to viewing portion 22, its field of view may be too limited to simultaneously capture both viewing portions 22 and 23. The use of multiple cameras 60, 62 allows for greater spatial coverage of the flow tube 20, while preserving a desired resolution. In the embodiment shown in FIG. 1, for example, a first camera 60 is positioned to capture an image of the slurry in viewing portion 22 of the flow tube 20, while a second camera 62 is positioned to capture an image of the slurry in second viewing portion 23 of the flow tube 20. In other embodiments (not shown) multiple cameras may be used to image different parts within the same viewing portion 22, or second viewing portion 23.

The computer 70 analyzes the digital image to determine one or more slurry characteristics. In embodiments, the computer 70 may also control the actuation of the various components of the system 10 such as the valves, the temperature control means, and the camera 60. It will be appreciated that a computer 70 is practically needed to analyze the digital images because of the large amount of information encoded by digital images (e.g., a single, high resolution, digital image in raster format may have millions of pixels, each associated with multiple color values), and the volume of digital images that could be generated by high frequency, intermittent or continuous analysis of a slurry diverted from a slurry process over an extended operating time.

The computer 70 may comprise a general purpose computer, a special purpose computer, a microcomputer, an integrated circuit, a programmable logic device or any other type of computing technology known in the art that is capable of analyzing the information encoded by the digital images. It will further be understood that the computer 70 may comprise computerized components of the camera 60. In the embodiment shown in FIG. 1, the computer 70 includes a general purpose computing device having a processor, a memory, buses associated with the processor to operatively connect the processor to the memory and the camera 60, and a display output. In embodiments, the processor may also be operatively connected to other components of the system 10 or of the slurry process 31 to control their actuation. The memory stores a set of instructions which are executed by the processor to analyze the digital image and perform the control functions.

Figure 2:
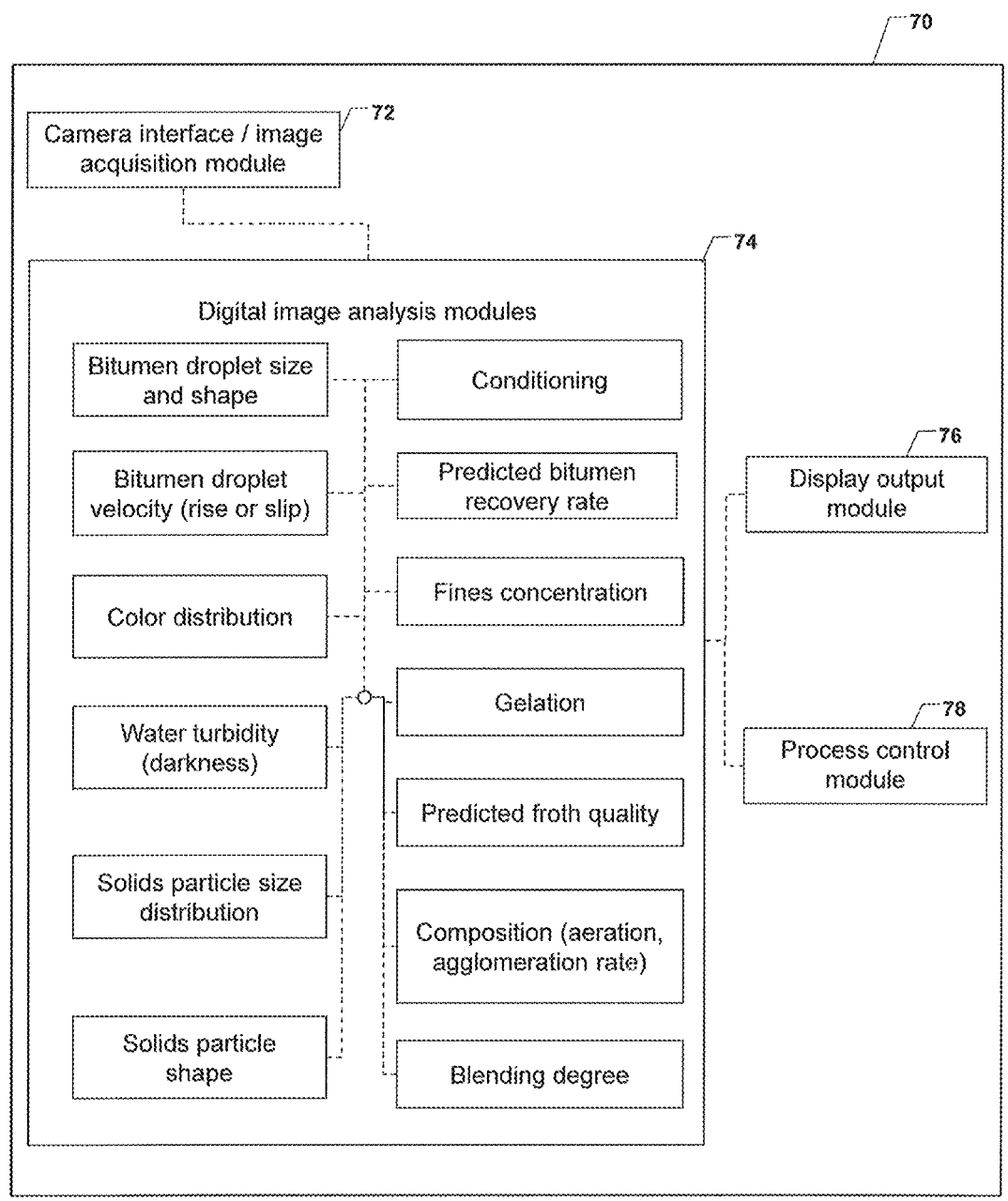
FIG. 2 is a functional block diagram of one embodiment of a computer of the system of the present invention for analyzing oil sands extraction slurries.

FIG. 2 shows a functional block diagram of an embodiment of a computer 70 used in the present invention for analyzing oil sands extraction slurries. A camera interface/image acquisition module 72 controls the acquisition of digital images from the camera 60, and may also control the camera 60 to determine when the camera 60 captures images of the oil sands extraction slurries and settings (e.g., shutter speed, focal length, magnification, color filtration, etc.) associated with the camera 60. The image analysis module or modules 74 control the analysis of the digital images to determine one or more slurry characteristics. Without limitation, these type of slurry characteristics in the case of an oil sands extraction slurry may include bitumen droplet size and shape, bitumen droplet rise or settling velocity, bitumen droplet shape, slurry color, slurry turbidity, sand grain particle shape, slurry conditioning, slurry turbidity, predicted bitumen recovery rate, fines concentration, gelation, predicted froth quality, aeration, agglomeration rate, and blending. The particular algorithm used to analyze the digital image will depend on the slurry characteristic to be determined. Further, it will be appreciated that image analysis modules 74 may directly determine some of the slurry characteristics by processing of the digital images, while indirectly determining other slurry characteristics based on pre-determined predictive relationships with directly determined slurry properties. The display output module 76 controls an output device (e.g., a display monitor, an audible signal, a printer) operatively connected to the computer 70 to generate an output of the determined slurry characteristics. The process control module 76 controls one or more components of the slurry process 31 to adjust the slurry characteristics.

Figure 3:
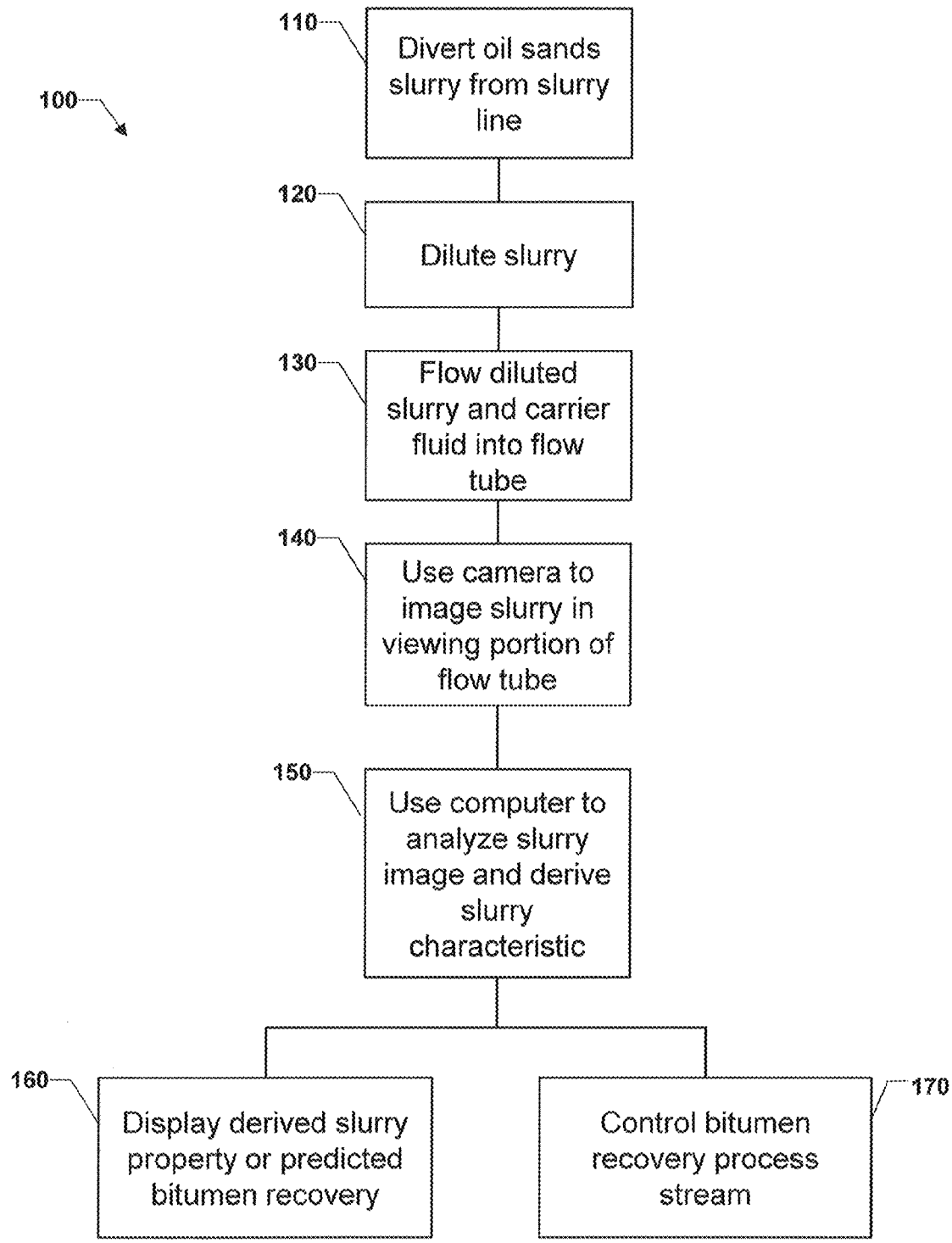
FIG. 3 is a flow chart of the steps of one embodiment of the method of the present invention for analyzing oil sands extraction slurries.

The use and operation of one embodiment of the system 10 is now described in a non-limiting example, with reference to the steps of method 100 shown in the flow chart of FIG. 3, to analyze an oil sands extraction slurry such as an oil sands slurry from a bitumen extraction process.

The system 10 is set up as shown in FIG. 1 with the slurry input line 28 connected to the slurry transport line 30 which feeds an oil sands slurry to a PSV (step 110). It will be understood that the present invention is not limited by the immediate source of the slurry in the slurry transport line 30. In other embodiments of the method, the slurry transport line 30 may be lines that transport middlings, underflow or tailings from parts of the slurry process 31 involved in the hot/warm water bitumen extraction process, including bitumen froth treatment and tailings treatment.

Where the flow tube 20 is made of glass, it has been found that wetting the flow tube 20 with water before flowing an oil sands slurry through the flow tube 20 helps prevent a build up of bitumen droplets in the flow tube 20, which can foul the flow tube 20. This water wetting process may be achieved by immersing the flow tube 20 in water for a few days prior to being installed into the system 10.

The dilution fluid line 48 feeds water from the water vessel 40 into the slurry inlet line 28 (step 120), such that the diluted oil sands slurry flows through the slurry inlet into and into the flow tube 20 at a flow rate of about 5 liters per second. At the same time, the carrier fluid valve is opened so that the carrier fluid line feeds water from the water vessel 40 through the carrier fluid line 38 and into the flow tube 20 at a flow rate of about 1 liter per second.

In the flow tube 20, the combination of the diluted oil sands slurry entering through slurry inlet 24 and water entering through the carrier fluid inlet 36 flow upwards within the flow tube 20 (step 130). The majority of the oil sands slurry flows upwards through the viewing portion 22 of the flow tube 20 for imaging by the camera 60, and ultimately through the slurry outlet 26 into reservoir 34. However, some of the slower moving particulate solids in the oil sands slurry may settle downwards in the flow tube 20 through the second viewing portion 23.

In order to prevent the particulate objects from re-circulating or agglomerating in the flow tube 20 and interfering with the imaging process, the computer 70 controls the valves to periodically flush the flow tube 20. This may be accomplished by temporarily closing slurry inlet line 28, while opening the carrier fluid valve 42 and bottom valve 46. As the carrier fluid line 38 discharges water into the flow tube 20, any particulate objects are flushed either through the bottom valve 46 or the slurry outlet 26 at the top of the flow tube 20.

The camera 60 images the oil sands slurry as it flows through viewing portion 22 of the flow tube 20 (step 140). Meanwhile, camera 62 images a portion of the oil sands slurry as it settles downwards through the second viewing portion 23 of the flow tube 20. As an example, the camera 62 and second viewing portion 23 may be used to diagnose problems such as poor aeration, liberation or solids attachment of bitumen droplets, which may be responsible for these bitumen droplets settling in the PSV and being recovered as underflow rather than floating to the top of the PSV and being recovered as primary bitumen froth.

Figure 4A:
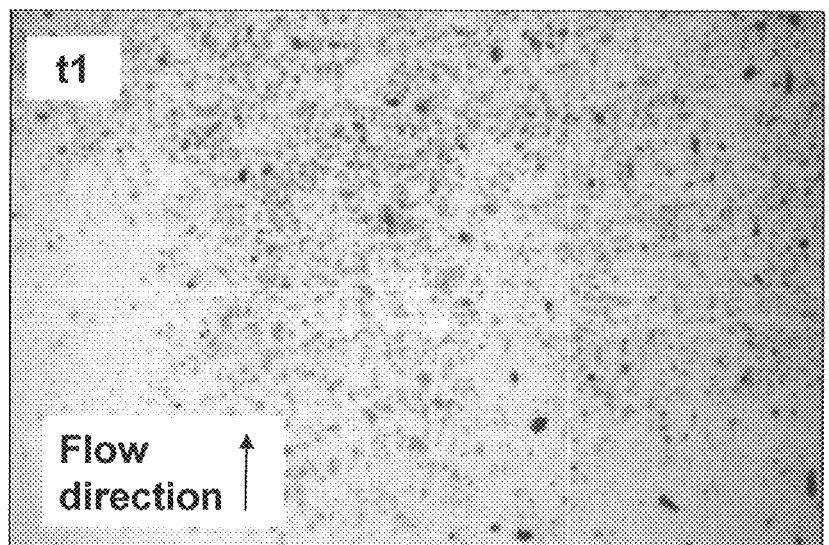
FIG. 4a and FIG. 4b are representations of digital images of an oil sands extraction slurry created by one embodiment of the system of the present invention, imaged at a first time instance and a second time instance, respectively.
Figure 4B:
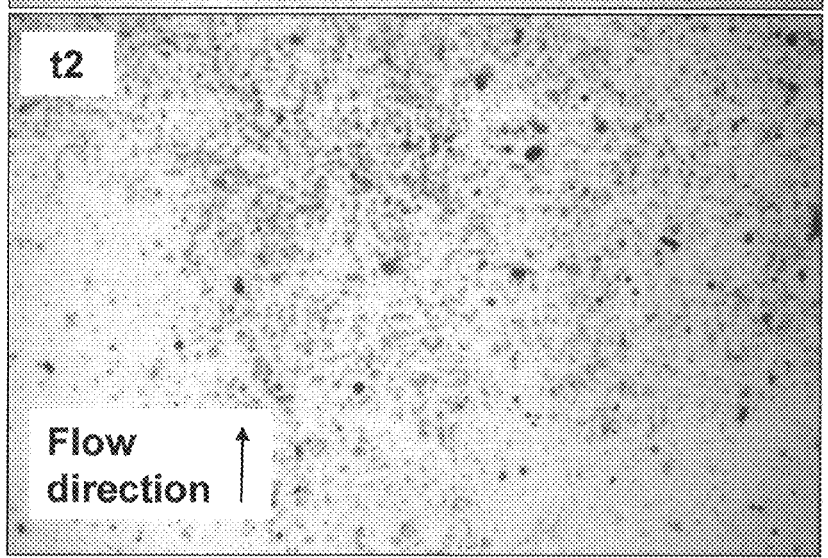

In one non-limiting example, the computer 70 actuates the camera 60 to produce a first digital image of the oil sands slurry at a first time instance, t1, as shown in FIG. 4a, and a second digital image of the oil sans slurry at a later second time instance, t2, as shown in FIG. 4b. The time elapsed from the first time instance to the second time instance is sufficiently small so that at least some of the same particulate objects are visible in both of the images. As an alternative, a first camera 60 and a second camera may be used to capture the same particulate objects in two disjoint parts of the viewing portion 22. The person skilled in the art will be able to select an appropriate time interval between the successive digital images, based on the flow rate of the oil sands slurry through the viewing portion 22 of the flow tube 20, and the field of view of the camera 60. In yet another alternative, the computer 70 actuates the camera 60 so that the exposure time of the camera 60 is sufficiently long to produce a streaked image of the particulate object as the particulate object moves through the field of view of the camera 60. The person skilled in the art will be able to select an appropriate exposure time based on the flow rate of the oil sands slurry through the viewing portion 22 of the flow tube 20 to produce a streak having a length within a desired range. Also, it will be understood that the computer 70 may actuate the camera 60 to continuously take images at certain time intervals, or that the camera 60 may take a video image of the oil sands slurry.

The computer 70 acquires the digital images produced by the camera 60 and analyzes them to determine one or more slurry characteristics (step 150). Although the analysis of the digital images are described in the following examples in notional terms, the person skilled in the art will appreciate that the analysis is actually implemented through algorithms that operate mathematically on the values that numerically define the digital image to extract meaningful information about the slurry characteristics.

Figure 4C:
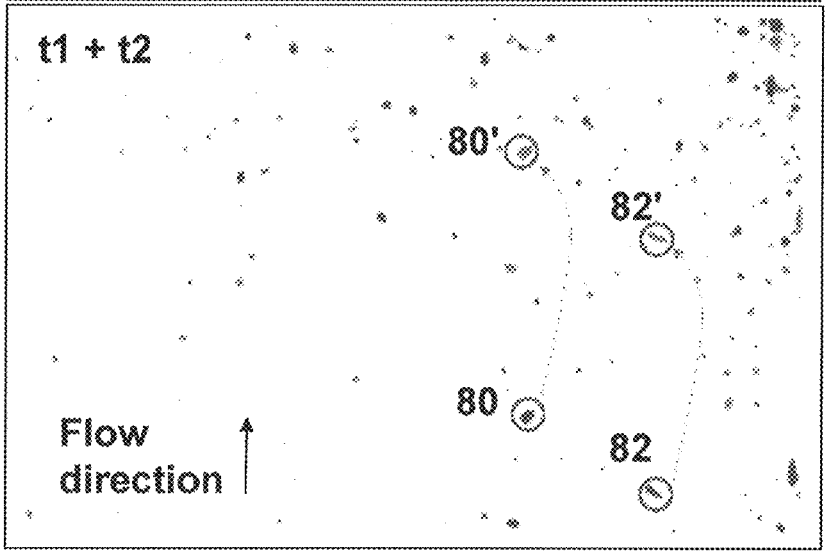
FIG. 4c is a superposition of the digital images of FIG. 4a and FIG. 4b.

In one analysis example, the computer 70 predicts bitumen recovery rate for the oil sands slurry in a PSV by determining the rise velocity of bitumen droplets through the viewing portion 22 of the flow tube 20. The rise velocity of bitumen droplets can be determined in accordance with a variety of methods. In one method, the computer 70 compares a first digital image as shown in FIG. 4a with a second digital image as shown in FIG. 4b. As shown in FIG. 4c, the first and second images are super-imposed, and the contrast is adjusted to filter out lighter colour particulate objects representing sands grains, and better discern the darker colour bitumen droplets. The computer 70 analyzes the super-imposed image to determine the geometry (size and shape) of bitumen droplets and identify pairs of particulate objects having sufficiently similar geometry that can be assumed to represent the same object at the first instance, t1, and at the second time instance, t2. As an example, this comparison may be performed by identifying clusters of pixels having similar color values and adjacency to other pixels. In FIG. 4c, for example, the computer 70 may identify bitumen droplets 80 and 80', as being the same bitumen droplet moving from a first position at time instance t1 to a second position at time instance t2. The computer 70 may calculate the displacement of the bitumen droplet 80, 80' over the time interval between time instance t1 and t2 to determine the rise (or settling) velocity of the bitumen droplet.

In another method, the computer 70 identifies a dark colour streak in a single digital image representing the path of the bitumen droplet as it rises through the field of view of the camera 60. As an example, the streak may be identified by pixels within a certain colour range that are adjacent to each other so as to form a continuous elongate region with a length greater than a specified threshold length. The computer 70 determines the vertical distance between the top and bottom of the streak and compares it to the exposure time used to capture the digital image, to determine the bitumen droplet's rise velocity.

Figure 5A:
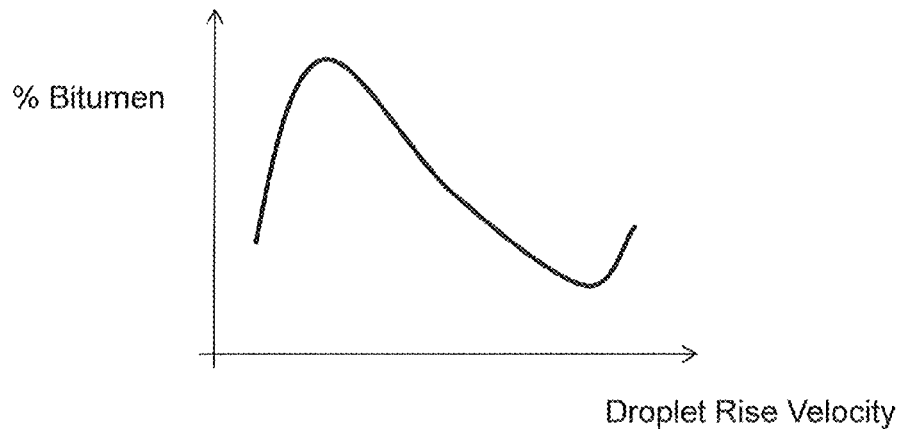
FIG. 5a is graphical representation of an exemplary distribution of bitumen droplet rise velocity in an oil sands extraction slurry.
Figure 5B:
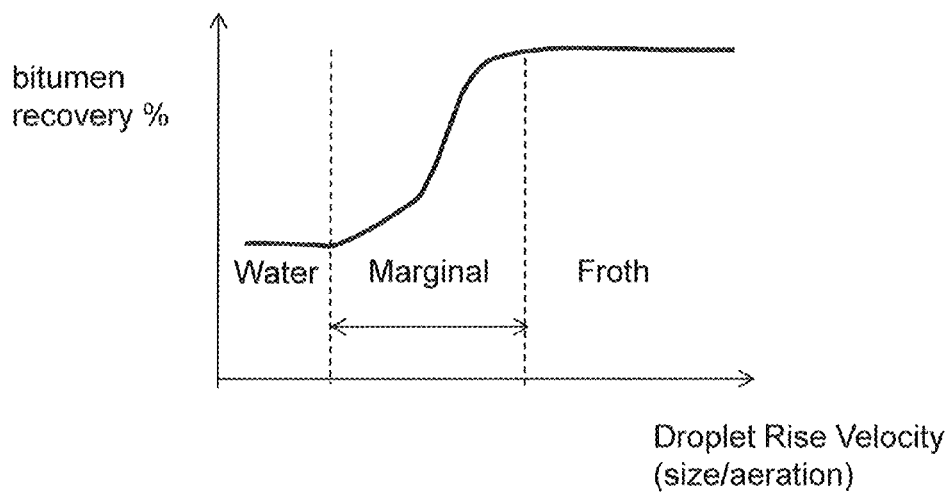
FIG. 5b is a graphical representation of an exemplary predictive relationship between bitumen droplet rise velocity and bitumen recovery in an oil sands extraction slurry for a hot/warm water bitumen extraction process.

Whichever method is used to determine the rise velocity of bitumen droplets, the same process can be performed for bitumen droplets 82 and 82', and a multitude of other droplets in the same pair of digital images or other pairs of digital images. As a result, the computer 70 determines a distribution of bitumen droplet rise velocities in the oil sands slurry, as may be graphically represented in FIG. 5*a*. The computer 70 can then predict a bitumen recovery rate for the oil sands slurry in the PSV, by correlating the determined bitumen droplet rise velocities to a pre-determined predictive relationship as shown graphically in the grade curve of FIG. 5*b*. In this example relationship, bitumen droplets having higher rise velocities indicative of larger sizes and good aeration are generally correlated with desirable froth formation in the PSV, and hence higher bitumen recovery rates.

Figure 6:
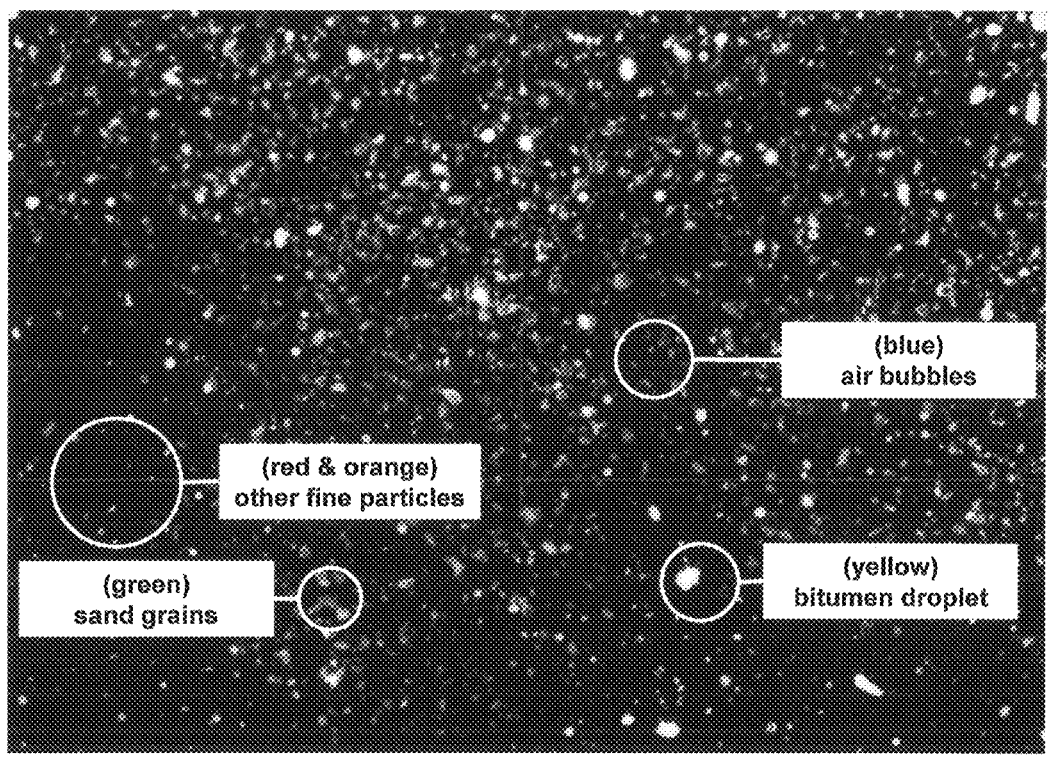
FIG. 6 is a representation of a digital image of an oil sands extraction slurry created by one embodiment of the system of the present invention, with the colors in negative.

In another analysis example, the computer 70 determines the concentration of different particulate objects in the oil sands slurry by analyzing information in the digital image concerning the color of the oil sands slurry. An example of such a digital image is shown in FIG. 6 with the colors in negative (i.e., colors are reversed into their respective complementary colors), so that the water appears black, bitumen droplets appear yellow, sand grains appear green, and other fine particles appear red or orange. The computer 70 may determine the portion of pixels that have numerical color values associated with a range of red or orange tones to determine the concentration of fines in the oil sands slurry, or with blue tones to determine the aeration of the oil sands slurry. This information can also be used to predict bitumen recovery rate by using pre-determined predictive relationships.

After the computer 70 has determined the oil sands slurry characteristics, the computer 70 may output the information to a visual display for an operator of the bitumen extraction process (step 160). The operator may use this information to make appropriate adjustments to the process parameters to optimize bitumen recovery or any other performance metric, to troubleshoot suboptimal bitumen recovery, or to understand the impact of operating parameters on bitumen recovery.

Alternatively or additionally, the computer 70 may further control one or more components of the slurry process 31 to automatically adjust the slurry process (step 170). For example, the computer 70 may compare the determined slurry characteristics associated with the predicted bitumen recovery rate or other performance metric, to target slurry characteristics required to achieve a target value or range of bitumen recovery rate or other performance metric, as determined from the a pre-determined predictive relationship. Based on this comparison, the computer 70 may actuate components (e.g., valves, pumps, sensors, heaters, and the like) of the oil sands extraction process to adjust process parameters (e.g., slurry composition, flow rate, temperature) towards the target slurry characteristics. By using a computer 70 to rapidly analyze images of the oil sands slurry diverted directly from the slurry transport line, it may be possible to continuously adjust the process parameters in real-time response to changing oil sands slurry characteristics.

In addition, more than one system 10 as previously described may be used to monitor and correlate a characteristic of an "input slurry" to a characteristic of an "output slurry". It will be understood that the terms "input slurry" and "output slurry" denote slurries at relative upstream and downstream steps, respectively, of a process. As an example of this application, the operator of a PSV may wish to determine the effect of a change in feedwell design on the bitumen recovery rate of a PSV. However, the bitumen recovery rate depends on the bitumen droplet rise velocity of the input slurry, which can vary with the oil sands feed stock. As such, unless it can be assumed that the input slurry characteristics are the same before and after the change in the feedwell design (which is unlikely in practical application), the operator cannot confidently attribute differences in PSV performance before and after the change in feedwell design to the change in feedwell design. In order to overcome this problem, a first system 10 may be used to characterize the bitumen droplet rise velocity of the input slurry that is fed into the PSV, while a second system 10 is used to characterize the bitumen content of the output slurry produced by the PSV. The first system 10 and second system 10 may share certain components such as a common computer 70, and may communicate with each other to correlate the characteristic of the input slurry to the characteristic of the output slurry, since the effect of the input slurry on the output slurry will not necessarily be instantaneous. Before changing the feedwell design, the first and second systems 10 are used to monitor the characteristics of the input slurry and output slurry, respectively, over a range of bitumen droplet rise velocities to generate a first grade curve such as shown in FIG. 6*b*. After changing the feedwell design, the process is repeated to generate a second grade curve. The operator can then quantify the change in PSV performance that is attributable to the change in feedwell design by comparing the first and second grade curves, for an input slurry characterized by a given bitumen droplet rise velocity.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

We claim:

1. A system for characterizing a slurry, the system comprising:
    (a) a flow tube comprising at least one transparent viewing portion, a slurry inlet, and a slurry outlet, the slurry inlet being disposed below the slurry outlet, and the at least one transparent viewing portion being disposed at either an elevation between the slurry inlet and the slurry outlet for upward flow of the slurry through the at least one transparent viewing portion, an elevation below the slurry inlet for downward settling of the slurry through the at least one transparent viewing portion, or both;

(b) at least one camera positioned to image the slurry flowing through the at least one transparent viewing portion of the flow tube; and
(c) a computer comprising a processor operatively connected to the camera, and a memory storing a set of instructions, wherein the processor is responsive to the set of instructions to execute a method comprising the steps of:
  (i) imaging the slurry flowing through the at least one transparent viewing portion of the flow tube to produce at least one digital image of the slurry; and
  (ii) analyzing the at least one digital image to determine at least one slurry characteristic.

2. The system of claim 1 wherein the slurry inlet is in fluid communication with a slurry transport line in a slurry process.

3. The system of claim 2 further comprising a slurry inlet line for transporting the slurry from the slurry transport line to the slurry inlet.

4. The system of claim 2 further comprising a fluid dilution line in fluid communication with the slurry inlet, upstream of the slurry inlet.

5. The system of claim 1 wherein the slurry outlet comprises an overflow weir.

6. The system of claim 1 wherein the flow tube further comprises a carrier fluid inlet disposed upstream of the at least one transparent viewing portion.

7. The system of claim 6 wherein:
the flow tube further comprises:
  (i) a slurry inlet valve for selectively opening and closing the slurry inlet; and
  (ii) a bottom valve for selectively opening and closing a bottom outlet of the flow tube;
the processor is operatively connected to the slurry inlet valve and the bottom valve; and
the method further comprises the step of closing the slurry inlet valve and opening the bottom valve while a carrier fluid flows into the flow tube via the carrier fluid inlet.

8. The system of claim 1 wherein the at least one transparent viewing portion is disposed at an elevation between the slurry inlet and the slurry outlet for upward flow of the slurry through the at least one viewing portion.

9. The system of claim 1 wherein the at least one viewing portion is disposed at an elevation below the slurry inlet for downward settling of the slurry through the at least one transparent viewing portion.

10. The system of claim 1 wherein the at least one transparent viewing portion comprises an upper viewing portion and a lower viewing portion, wherein the upper viewing portion is disposed at an elevation between the slurry inlet and the slurry outlet for upward flow of the slurry through the upper viewing portion, and the lower viewing portion is disposed at an elevation below the slurry inlet for downward settling of the slurry through the lower viewing portion.

11. The system of claim 1 wherein the at least one transparent viewing portion is formed by two opposed planar surfaces separated by a gap having a size less than the width of the adjacent upstream and adjacent downstream portions of the flow tube.

12. The system of claim 11 wherein the gap is about 2 millimeters.

13. The system of claim 1 wherein the at least one camera is configured to resolve a particulate object in the slurry having a size of about 600 µm or smaller.

14. The system of claim 13 wherein the at least one camera is configured to resolve the particulate object in the slurry having a size of about 100 µm or smaller.

15. The system of claim 1 wherein the at least one transparent viewing portion comprises a first viewing portion and a second viewing portion, and the at least one camera comprises a first camera positioned to image the slurry flowing through the first viewing portion, and a second camera positioned to image the slurry flowing through the second viewing portion.

16. The system of claim 1 wherein the slurry is an oil sands extraction slurry and the at least one slurry characteristic is selected from the group consisting of: a bitumen droplet size; a bitumen droplet shape, a bitumen droplet rise or settling velocity; a slurry color; a turbidity; a solids particle size distribution; a solids particle shape; a conditioning indicator; a predicted bitumen recovery rate; a fines concentration; a gelation indicator; a predicted froth quality; a slurry composition; and a blending indicator.

17. The system of claim 1 wherein the analyzing step comprises measuring movement of a particulate object in the slurry to calculate a rise or settling velocity of the particulate object.

18. The system of claim 1 wherein the analyzing step comprises determining a presence of a color or range of colors in the digital image indicative of a component of the slurry to calculate a concentration of the component in the slurry.

19. The system of claim 1 wherein the slurry is an oil sands extraction slurry and the analyzing step further comprises the step of determining a bitumen recovery rate for the slurry in a hot/warm water extraction process based on a predictive relationship with the determined at least one slurry characteristic.

20. The system of claim 1 further comprising a means for controlling the temperature of the slurry at the slurry inlet.

21. A method for characterizing a slurry, the method comprising the steps of:
(a) receiving the slurry in a flow tube comprising at least one transparent viewing portion;
(b) allowing a first portion of the slurry to flow upwardly through a first viewing portion of the flow tube;
(c) imaging the first portion of the slurry with at least one camera as the first portion of the slurry flows through the first viewing portion to produce at least one first digital image of the slurry; and
(d) analyzing the at least one first digital image with a computer to determine at least one slurry characteristic.

22. The method of claim 21 wherein the slurry is an oil sands extraction slurry.

23. The method of claim 21 further comprising, prior to the receiving step, the step of diverting the slurry from a slurry transport line used in a slurry process.

24. The method of claim 23 further comprising, prior to the receiving step, the step of diluting the slurry with a diluting fluid.

25. The method of claim 21 wherein, the receiving step comprises flowing a carrier fluid through the flow tube to carry the slurry through the at least one viewing portion of the flow tube.

26. The method of claim 21 further comprising:
(e) allowing a second portion of the slurry to settle downwardly through a second viewing portion of the flow tube;
(f) imaging the second portion of the slurry with at least one camera as the second portion of slurry settles through the second viewing portion to produce at least one second digital image of the slurry; and (g) analyzing the at least one second digital image with a computer to determine at least one slurry characteristic.

27. The method of claim 26 wherein the analyzing steps comprises measuring movement of a particulate object in the slurry to calculate a rise or settling velocity of the particulate object.

28. The method of claim 21 wherein the at least one viewing portion is formed by two opposed planar surfaces separated by a gap having a size less than the width of the adjacent upstream and adjacent downstream portions of the flow tube.

29. The method of claim 21 wherein, in the imaging step, the slurry is imaged at a resolution sufficient to resolve a particulate object in the slurry having a size of about 600 µm or smaller.

30. The method of claim 29 wherein, in the imaging step, the resolution is sufficient to resolve a particulate object in the slurry having a size of about 100 µm or smaller.

31. The method of claim 21 wherein the slurry is an oil sands extraction slurry and the at least one slurry characteristic is selected from the group consisting of: a bitumen droplet size; a bitumen droplet shape, a bitumen droplet rise or settling velocity; a slurry color; a turbidity; a solids particle size distribution; a solids particle shape; a conditioning indicator; a predicted bitumen recovery rate; a fines concentration; a gelation indicator; a predicted froth quality; a slurry composition; and a blending indicator.

32. The method of claim 21 wherein the analyzing step comprises determining a presence of a color or range of colors in the digital image indicative of a component of the slurry to calculate a concentration of the component in the slurry.

33. The method of claim 21 wherein the slurry is an oil sands extraction slurry and the analyzing step further comprises the step of determining a bitumen recovery rate for the slurry in a hot/warm water extraction process based on a predictive relationship with the determined at least one slurry characteristic.

34. The method of claim 21 further comprising, prior to the receiving step, the step of heating or cooling the slurry to control the temperature of the slurry.

35. A method for online control of a slurry process for processing a slurry, the method comprising the steps of:

(a) receiving the slurry in a flow tube comprising at least one transparent viewing portion;

(b) allowing a portion of the slurry to flow upwardly through the at least one transparent viewing portion;

(c) imaging the portion of the slurry with at least one camera as the portion of the slurry flows through the at least one viewing portion to produce at least one digital image of the slurry;

(d) analyzing the at least one digital image with a computer to determine at least one slurry characteristic;

(e) determining a performance metric for the slurry process based on a predictive relationship with the determined at least one slurry characteristic; and (f) based on the determined at least one slurry characteristic and the determined performance metric, adjusting an operating parameter of the slurry process to adjust the performance metric towards a target value or range.

36. The method of claim 35 wherein the slurry is an oil sands extraction slurry and the slurry process is an oil sands extraction slurry process.

* * * * *